United States Patent
Jiang et al.

(10) Patent No.: US 11,308,058 B1
(45) Date of Patent: Apr. 19, 2022

(54) BUILDING AND USING COMBINED MULTI-TYPE SUB-INDICES TO SEARCH NOSQL DATABASES

(71) Applicant: International Business Machines Corporation, Armonk, NY (US)

(72) Inventors: Peng Hui Jiang, Beijing (CN); Xin Peng Liu, Beijing (CN); Shuo Li, Beijing (CN); Sheng Yan Sun, Beijing (CN); Xiaobo Wang, Beijing (CN); Yue Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/140,397

(22) Filed: Jan. 4, 2021

(51) Int. Cl.
*G06F 7/00* (2006.01)
*G06F 16/22* (2019.01)
*G06F 11/34* (2006.01)
*G06F 16/2457* (2019.01)
*G06F 16/248* (2019.01)

(52) U.S. Cl.
CPC ...... *G06F 16/2264* (2019.01); *G06F 11/3409* (2013.01); *G06F 16/248* (2019.01); *G06F 16/2457* (2019.01)

(58) Field of Classification Search
CPC ............. G06F 16/2264; G06F 16/2457; G06F 16/248; G06F 11/3409; G06F 12/0292; G06F 16/10; G06F 2212/7201; G06F 2212/7204
See application file for complete search history.

(56) References Cited

U.S. PATENT DOCUMENTS

| | | | |
|---|---|---|---|
| 6,980,976 B2 | 12/2005 | Alpha et al. | |
| 7,647,291 B2 | 1/2010 | Mosescu | |
| 7,783,660 B2 | 8/2010 | Nomula et al. | |
| 9,953,102 B2 | 4/2018 | Zhou et al. | |
| 10,489,412 B2 | 11/2019 | Isherwood et al. | |
| 11,093,518 B1* | 8/2021 | Lu | G06F 16/9535 |
| 2014/0195542 A1* | 7/2014 | Larson | G06F 16/24554 |
| | | | 707/741 |

(Continued)

OTHER PUBLICATIONS

"Parallel preprocessing and distributed indexing," HCL Technologies, accessed Oct. 9, 2020, 4 pages. https://help.hcltechsw.com/commerce/8.0.0/search/concepts/csdsearchparallel.html.

(Continued)

*Primary Examiner* — Mohammad A Sana
(74) *Attorney, Agent, or Firm* — Yee & Associates, P.C.

(57) ABSTRACT

Building and using multiple different types of sub-indices to search a database is provided. A plurality of different physical data ranges is generated within the database based on a set of logical hot data ranges and a set of logical non-hot data ranges to form a set of physical hot data ranges and a set of physical non-hot data ranges. A set of sub-index types is built for each respective data range of the plurality of different physical data ranges within the database using a set of selected high-speed sub-index types for the set of physical hot data ranges and another set of selected sub-index types for the set of physical non-hot data ranges to accelerate data availability for query. An index is built for the database using the set of sub-index types built for each respective data range of the plurality of different physical data ranges within the database.

20 Claims, 11 Drawing Sheets

(56) References Cited

U.S. PATENT DOCUMENTS

| | | | | |
|---|---|---|---|---|
| 2014/0297947 | A1* | 10/2014 | Tamura | G06F 3/0649 |
| | | | | 711/114 |
| 2020/0218748 | A1 | 7/2020 | Liu et al. | |
| 2021/0133157 | A1* | 5/2021 | Yin | G06F 16/178 |
| 2021/0232484 | A1* | 7/2021 | Keneally | G06F 9/54 |

OTHER PUBLICATIONS

Peng et al., "Data Series Indexing Gone Parallel," IEEE 36th International Conference on Data Engineering (ICDE), Apr. 2020, 5 pages. https://ieeexplore.ieee.org/document/9101514.

Drake, "Understanding Database Sharding," DigitalOcean, Feb. 7, 2019, accessed Oct. 10, 2020, 19 pages. https://www.digitalocean.com/community/tutorials/understanding-database-sharding.

Levandoski et al., Identifying Hot and Cold Data in Main-Memory Databases, IEEE 29th International Conference on Data Engineering (ICDE), Apr. 2013, 12 pages. https://ieeexplore.ieee.org/document/6544811.

Ali et al., "The PN-Tree: A Parallel and Distributed Multidimensional Index," Distributed and Parallel Databases, Mar. 2005, 20 pages. https://dl.acm.org/doi/10.1007/s0619-004-0234-6.

"Configuring Indexing and Search Service for High Availability," Oracle, accessed Oct. 9, 2020, 21 pages. https://docs.oracle.com/cd/E65107_01/doc.105/e67901/issig_ha.htm#ISSIG518.

\* cited by examiner

BUILDING AND USING COMBINED MULTI-TYPE SUB-INDICES TO SEARCH NOSQL DATABASES

BACKGROUND

1. Field

The disclosure relates generally to not only structured query language ("NoSQL") databases and more specifically to building and using a combination of multiple different types of sub-indices to search different data ranges within a NoSQL database even though an entire index for the NoSQL database is not yet built and available for use.

2. Description of the Related Art

A NoSQL database provides a mechanism for storage and retrieval of data that is modeled in means other than tabular relations used in relational databases. Data structures commonly used by NoSQL databases are, for example, key-value pair, document, column, and graph, which are different from those used in relational databases, making some operations faster in NoSQL. While NoSQL databases have existed for many years, NoSQL databases have recently become increasingly popular in the era of cloud, big data, and high-volume web and mobile applications. NoSQL databases are chosen today for their attributes regarding scale, performance, and ease of use. Many NoSQL databases support SQL-like queries, but because in a world of microservices and polyglot persistence, NoSQL and relational databases are now commonly used together in a single application.

A database index is a data structure that improves the speed of data retrieval operations on a database at the cost of additional writes and storage space to maintain the index. Indices are used to quickly locate data without having to search every row in a database table every time a database table is accessed. Indices can be build using one or more selected columns of data (i.e., key columns) from a database, providing for both rapid random lookups and efficient access to requested data.

A query is a specific request corresponding to information in a database. There are two basic types of queries, select queries and action queries. Select queries return information from a database and can be used to specify how many results are returned, the order in which the results are returned, and the like. Action queries perform a command, such as, for example, create, update, or delete, on the data that have been retrieved and can modify a large number of data records in bulk instead of one at a time.

SUMMARY

According to one illustrative embodiment, a computer-implemented method for building and using multiple different types of sub-indices to search a database is provided. A computer generates a plurality of different physical data ranges within the database based on a set of logical hot data ranges and a set of logical non-hot data ranges of a plurality of different logical data ranges to form a set of physical hot data ranges and a set of physical non-hot data ranges. The computer builds a set of sub-index types for each respective data range of the plurality of different physical data ranges within the database using a set of selected high-speed sub-index types for the set of physical hot data ranges and another set of selected sub-index types for the set of physical non-hot data ranges to accelerate data availability for query. The computer builds an index for the database using the set of sub-index types built for each respective data range of the plurality of different physical data ranges within the database. According to other illustrative embodiments, a computer system and computer program product for building and using multiple different types of sub-indices to search a database are provided.

DETAILED DESCRIPTION

Figure 1:
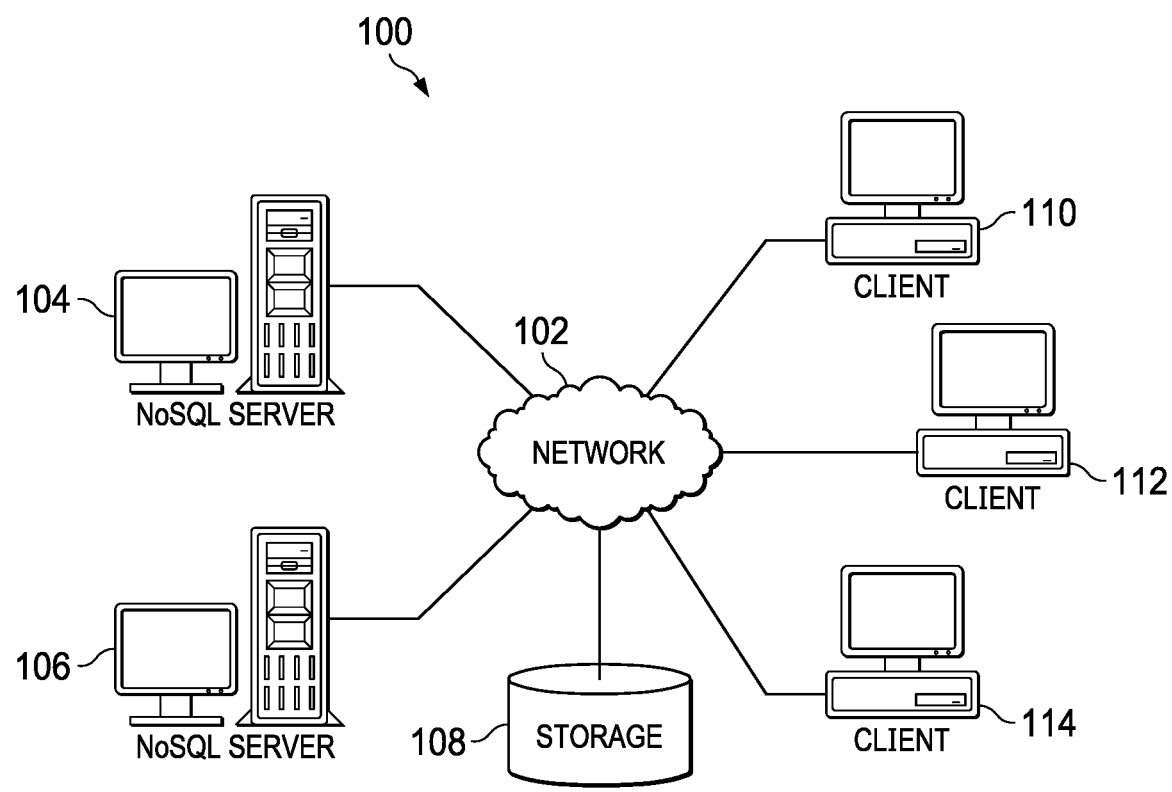
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
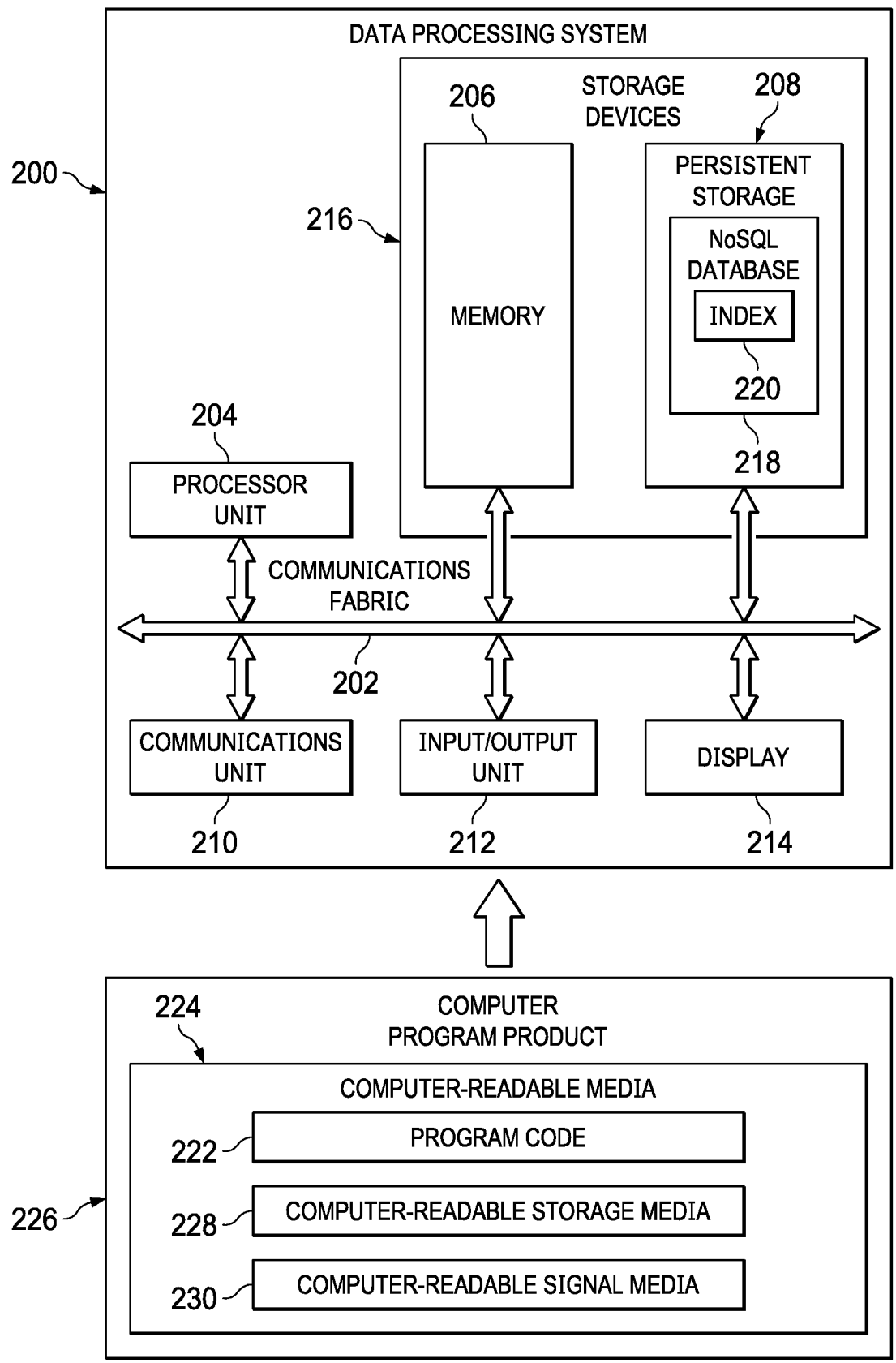
FIG. 2 is a diagram of a data processing system in which illustrative embodiments may be implemented.
Figure 3:
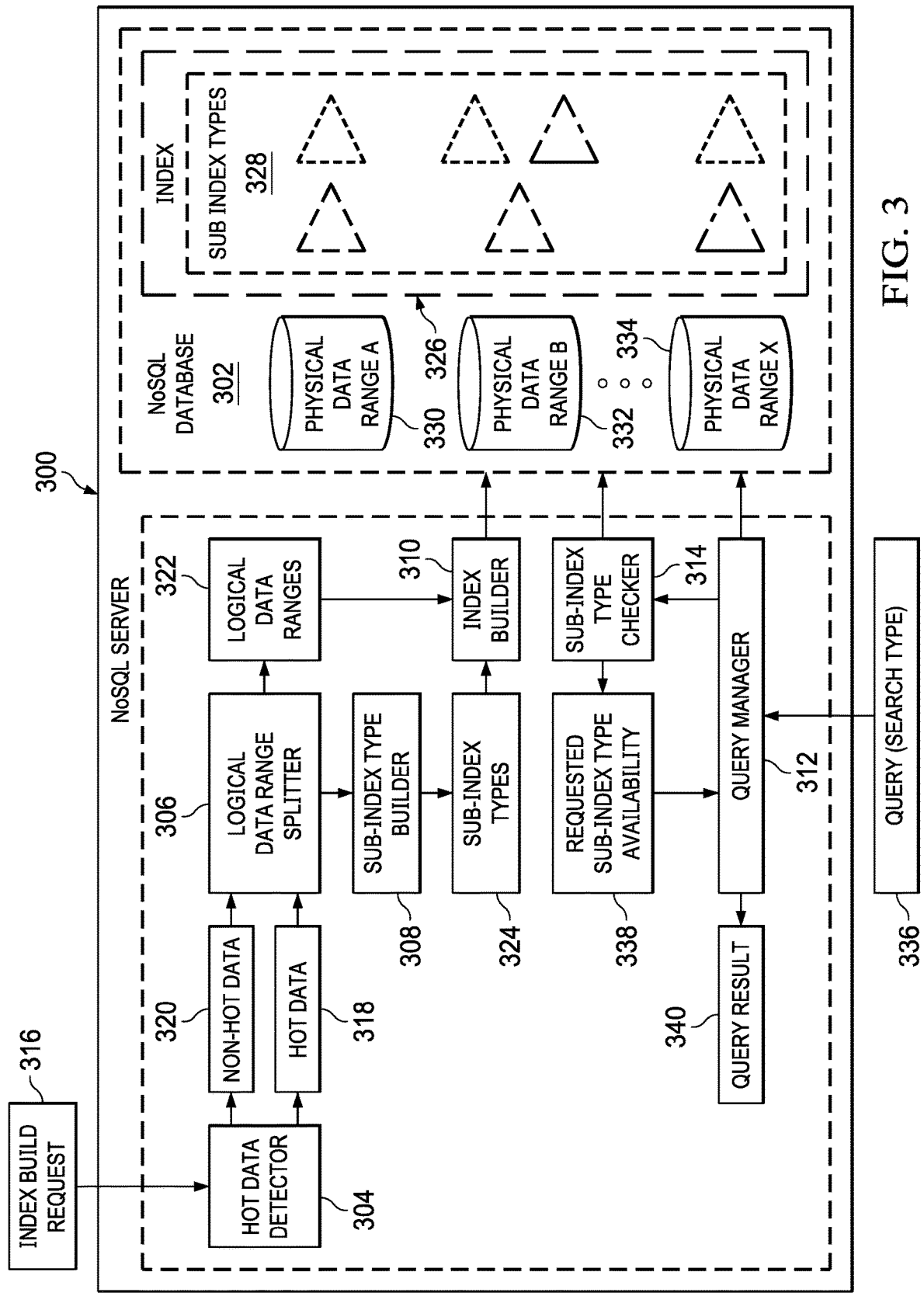
FIG. 3 is a diagram illustrating an example of a NoSQL server in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, NoSQL server 104 and NoSQL server 106 connect to network 102, along with storage 108. NoSQL server 104 and NoSQL server 106 may be, for example, server computers with high-speed connections to network 102. In addition, NoSQL server 104 and NoSQL server 106 provide data storage services for one or more data domains, such as, for example, a financial data domain, a banking data domain, a governmental data domain, an educational data domain, an entertainment data domain, a healthcare data domain, an insurance data domain, a business data domain, and the like. NoSQL server 104 and NoSQL server 106 may store the data in a structured format, such as a tabular format, or an unstructured format, such as an object-oriented format. Also, it should be noted that NoSQL server 104 and NoSQL server 106 may each represent a cluster of servers in one or more data centers. Alternatively, NoSQL server 104 and NoSQL server 106 may each represent multiple computing nodes in one or more cloud environments.

Client 110, client 112, and client 114 also connect to network 102. Clients 110, 112, and 114 are clients of NoSQL server 104 and NoSQL server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart glasses, smart televisions, gaming devices, kiosks, and the like, with wire or wireless communication links to network 102. Users of clients 110, 112, and 114 may utilize clients 110, 112, and 114 to send queries to NoSQL server 104 and NoSQL server 106 and receive query results from NoSQL server 104 and NoSQL server 106.

Storage 108 is a network storage device capable of storing any type of data in a structured format or an unstructured format. In addition, storage 108 may represent a plurality of network storage devices. Further, storage 108 may store identifiers and network addresses for a plurality of different NoSQL servers, identifiers and network addresses for a plurality of different client devices, identifiers for a plurality of different client device users, and the like. Furthermore, storage 108 may store other types of data, such as authentication or credential data that may include user names, passwords, and biometric data associated with database administrators and client device users, for example.

In addition, it should be noted that network data processing system 100 may include any number of additional NoSQL server computers, client devices, storage devices, and other devices not shown. Program code located in network data processing system 100 may be stored on a computer readable storage medium and downloaded to a computer or other data processing device for use. For example, program code may be stored on a computer readable storage medium on NoSQL server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as NoSQL server 104 in FIG. 1, in which computer readable program code or instructions implementing the NoSQL database index building processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores NoSQL database 218. However, it should be noted that even though NoSQL database 218 is illustrated as residing in persistent storage 208, in an alternative illustrative embodiment NoSQL database 218 may be a separate component of data processing system 200. In another alternative illustrative embodiment, a first set of data of NoSQL database 218 may be located in data processing system 200 and a second set of data of NoSQL database 218 may be located in a second data processing system, such as, for example, NoSQL server 106 or storage 108 in FIG. 1. In yet another alternative illustrative embodiment, NoSQL database 218 may be located in storage and managed by data processing system 200.

NoSQL database 218 may store any type and amount of searchable data. Data processing system 200 utilizes index 220 to search NoSQL database 218 based on queries received from users of client devices, such as, for example, clients 110, 112, and 114 in FIG. 1, via a network, such as, for example, network 102 in FIG. 1. The queries may include select queries and action queries. Data processing system 200 builds index 220 using a plurality of different sub-index types, such as, for example, a geospatial sub-index type, a full-text sub-index type, a B-tree sub-index type, and the like. It should be noted that when a particular sub-index type corresponding to a particular data range or shard of NoSQL database 218 is built, that particular sub-index type is immediately available for use to search its corresponding data range or shard even though index 220 in not completely built, enabling increased availability for query of that particular data range or shard.

Communications unit 210, in this example, provides for communication with other computers, data processing systems, and devices via the network. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. For example, a database administrator may utilize input/output unit 212 to input a request to build or rebuild index 220 for NoSQL database 218. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 222 is located in a functional form on computer readable media 224 that is selectively removable and may be loaded onto or transferred to data processing system 200 for running by processor unit 204. Program code 222 and computer readable media 224 form computer program product 226. In one example, computer readable media 224 may be computer readable storage media 228 or computer readable signal media 230.

In these illustrative examples, computer readable storage media 228 is a physical or tangible storage device used to store program code 222 rather than a medium that propagates or transmits program code 222. Computer readable storage media 228 may include, for example, an optical or magnetic disc that is inserted or placed into a drive or other device that is part of persistent storage 208 for transfer onto a storage device, such as a hard drive, that is part of persistent storage 208. Computer readable storage media 228 also may take the form of a persistent storage, such as a hard drive, a thumb drive, or a flash memory that is connected to data processing system 200.

Alternatively, program code 222 may be transferred to data processing system 200 using computer readable signal media 230. Computer readable signal media 230 may be, for example, a propagated data signal containing program code 222. For example, computer readable signal media 230 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 224" can be singular or plural. For example, program code 222 can be located in computer readable media 224 in the form of a single storage device or system. In another example, program code 222 can be located in computer readable media 224 that is distributed in multiple data processing systems. In other words, some instructions in program code 222 can be located in one data processing system while other instructions in program code 222 can be located in one or more other data processing systems. For example, a portion of program code 222 can be located in computer readable media 224 in a server computer while another portion of program code 222 can be located in computer readable media 224 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 222.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

NoSQL was introduced with the information explosion. NoSQL addresses big data and unstructured data scenarios. This implies that a search of big or unstructured data is quite important to understand and to leverage that data. Typically, an index is used to search against data in a NoSQL database. However, it frequently takes time, from hours, days, weeks, or even months, to build an entire index for big data or unstructured data. As a result, a search of that NoSQL database is unavailable until the entire index of that NoSQL database is completely built. This often leads to frustration for users who are waiting for completion of the index building process to search the NoSQL database.

Even though ways currently exist to build an index in parallel, the index still needs to be built with a given granularity and sequence. This takes time to build the entire index with the given granularity and sequence and causes index unavailability. When the index is unavailable, this index unavailability has a direct impact on service level agreements corresponding to service and support. However, illustrative embodiments provide increased index availability.

Illustrative embodiments build an index for a NoSQL database by combining different sub-index types to accelerate the availability of data for query. This includes illustrative embodiments identifying hot data within the NoSQL database based on data usage (i.e., dynamic data that is accessed above a defined threshold level) and other data metrics, such as, for example, number of queries associated with data, query priority, data age, data range, data size, and the like. Illustrative embodiments divide the entire NoSQL database into different physical data ranges or shards based on determined logical data ranges within the NoSQL database. Sharding is a type of database partitioning that separates a large database into smaller, faster, more easily managed parts called data shards.

Illustrative embodiments build the index for the NoSQL database using a plurality of different sub-index types, such as, for example, a geospatial sub-index type, a B-tree sub-index type, a full-text sub-index type, and the like. For a hot data range within the NoSQL database, illustrative embodiments select a particular sub-index type, such as, for example, a B-tree index type, which illustrative embodiments can build with increased speed and extensibility. For non-hot data ranges, illustrative embodiments select and build other sub-index types, such as, for example, a geospatial sub-index type, a full-text sub-index type, and the like, to accelerate the availability of those non-hot data ranges or shards. In addition, illustrative embodiments adjust the logical data ranges or shards according to data usage and cost of building the entire index using the plurality of different sub-index types.

Illustrative embodiments utilize a sub-index type checker to detect availability of a currently requested sub-index type corresponding to a particular data range. Illustrative embodiments utilize the sub-index type associated with the search type of the query when the requested sub-index type corresponding to the query for that particular data range is available. For an unavailable sub-index type corresponding to that particular data range, illustrative embodiments convert the search type of the query to another search type associated with an available sub-index type for that particular data range. When there are no available sub-index types corresponding to that particular data range, illustrative embodiments utilize a full-text scan of that particular data range.

Thus, illustrative embodiments make sub-indices available as quickly as possible for use. For example, illustrative embodiments can utilize a specific sub-index type to search a hot data range. As a result, illustrative embodiments can perform a search of the hot data range without waiting for days, weeks, or even months for the entire index to be built or rebuilt for the NoSQL database. Consequently, illustrative embodiments enable increased availability of sub-index types in the NoSQL database. Further, illustrative embodiments address the contradiction between index rebuild workload and index availability. Moreover, illustrative embodiments assist applications to access data with high performance to meet customer needs in NoSQL prior to an entire index for a NoSQL database being built and available for use. Hence, illustrative embodiments increase performance of the NoSQL database server, itself.

Thus, illustrative embodiments provide one or more technical solutions that overcome a technical problem with searching a NoSQL database prior to an entire index for the NoSQL database being built and available for use. As a result, these one or more technical solutions provide a technical effect and practical application in the field of NoSQL databases.

With reference now to FIG. 3, a diagram illustrating an example of a NoSQL server is depicted in accordance with an illustrative embodiment. NoSQL server 300 may be implemented in a computer, such as, for example, NoSQL server 104 in FIG. 1 or data processing system 200 in FIG. 2. NoSQL server 300 is a system of hardware and software components for building and using a combination of different types of sub-indices to search corresponding data ranges within a NoSQL database even though an entire index for the NoSQL database is not yet built and available for use.

In this example, NoSQL server 300 includes NoSQL database 302, hot data detector 304, logical data range splitter 306, sub-index type builder 308, index builder 310, query manager 312, and sub-index type checker 314. NoSQL database 302 may be, for example, NoSQL database 218 in FIG. 2.

NoSQL server 300 receives index build request 316 from a database administrator, for example. Index build request 316 is a request to build or rebuild an index for NoSQL database 302. In response to receiving index build request 316, NoSQL server 300 utilizes hot data detector 304 to identify hot data 318 and non-hot data 320 within NoSQL database 302. Hot data 318 represent data that are used above a predefined threshold level within NoSQL database 302. Non-hot data 320 represent data that are used below the predefined threshold level within NoSQL database 302.

Logical data range splitter 306 utilizes the identification of hot data 318 and non-hot data 320 to divide the data within NoSQL database 302 into logical data ranges 322. Logical data ranges 322 include a set of logical hot data ranges and a set of non-hot data ranges. Sub-index type builder 308 selects and builds sub-index types 324 for logical data ranges 322 to enable faster building of index 326 for NoSQL database 302. Sub-index types 324 represent a set of sub-index types for each respective logical data range in logical data ranges 322. Sub-index types 324 may include, for example, B-tree sub-indices, geospatial sub-indices, full-text sub-indices, and the like. Sub-index type builder 308 may adjust building one or more of sub-index types 324 (e.g., a set of sub-index types for hot data ranges) according to data metrics, such as, for example, data query frequency, query priority, data age, and the like.

Logical data range splitter 306 also generates or defines physical data ranges, such as physical data range "A" 330, physical data range "B" 332, and physical data range "X" 334, for NoSQL database 302 based on logical data ranges 322. It should be noted that logical data range splitter 306 may generate the physical data ranges from the logical data ranges on a one-to-one basis or a one-to-many basis. In other words, logical data range splitter 306 may generate one physical data range from one logical data range or may generate multiple physical data ranges from one logical data range. Further, logical data range splitter 306 can dynamically adjust logical data ranges 322 based on data usage and cost of building index 326 using different sub-index types, such as sub-index types 328. It should be noted that sub-index types 328 are the same as sub-index types 324. Also, it should be noted that each of physical data range "A" 330, physical data range "B" 332, and physical data range "X" 334 has a corresponding set of sub-index types. Further, it should be noted that each respective sub-index type in sub-index types 328 once built, is available for use against its corresponding physical data range, even though index builder 310 may not have completely built index 326 (i.e., finished building all sub-index types 328, which comprise index 326 in its entirety).

NoSQL server 300 utilizes query manager 312 to receive query 336. Query 336 is of a particular search type, which corresponds to a particular sub-index type. After receiving query 336, query manager 312 utilizes sub-index type checker 314 to determine whether that particular sub-index type corresponding to the particular search type of query 336 is available for searching a particular physical data range within NoSQL database 302. At 338, sub-index type checker 314 informs query manager 312 of the availability of the requested sub-index type.

In response to the requested sub-index type not being currently available, query manager 312 performs a conversion of query 336 from its original search type to a different or alternative search type corresponding to an alternative available sub-index type for searching the particular physical data range within NoSQL database 302. Sub-index type checker 314 provides the alternative sub-index type once query manager 312 converts query 336 to the different search type. After the alternative sub-index type searches the corresponding physical data range, query manager 312 generates query result 340.

Figure 4:
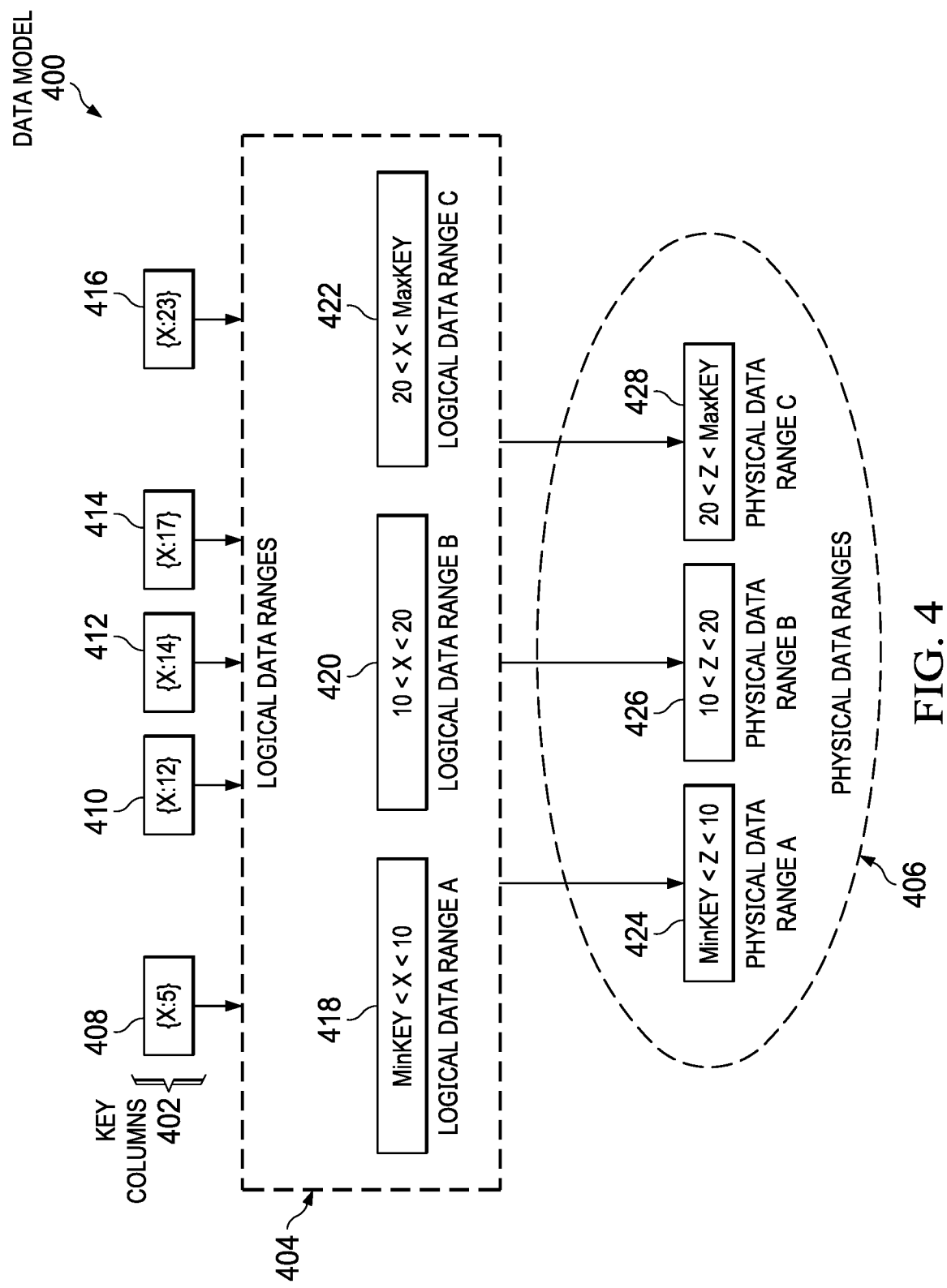
FIG. 4 is a diagram illustrating an example of a data model in accordance with an illustrative embodiment.

With reference now to FIG. 4, a diagram illustrating an example of a data model is depicted in accordance with an illustrative embodiment. Data model 400 may be implemented in a NoSQL database, such as, for example, NoSQL database 302 in FIG. 3.

Data model 400 includes key columns 402, logical data ranges 404, and physical data ranges 406. An index, such as, for example, index 326 in FIG. 3, contains key columns 402 built from selected columns in the NoSQL database. Key columns 402 enable the NoSQL server to find the rows associated with the key values quickly and efficiently.

In this example, key columns 402 include key columns 408, 410, 412, 414, and 416. A logical data range splitter, such as, for example, logical data range splitter 306 in FIG. 3, divides the data corresponding to key columns 408, 410, 412, 414, and 416 into logical data ranges 404. In this example, the logical data splitter places the data corresponding to key column 408, which is "X:5", in logical data range "A" 418, which is "minKey<X<10". Similarly, the logical data splitter places the data corresponding to key columns 410, 412, and 414, which are "x:12", "X:14", and "X:17", respectively, in logical data range "B" 420, which is "10<X<20". In addition, the logical data splitter places the data corresponding to key column 416, which is "X:23", in logical data range "C" 422, which is "20<X<maxKey".

Further, the logical data range splitter can dynamically adjust each of logical data ranges 404 based on data usage and cost of building the index. Furthermore, the logical data range splitter generates physical data ranges 406 based on logical data ranges 404. In this example, there is a one-to-one relationship between physical data ranges 406 and logical data ranges 404. Consequently, physical data ranges 406 include physical data range "A" 424, which is "minKey<Z<10", physical data range "B" 426, which is "10<Z<20", and physical data range "C" 428, which is "20<Z<maxKey".

It should be noted that a set of sub-index types correspond to a respective physical data range in physical data ranges 406. Furthermore, different sub-index types corresponding to different physical data ranges can have different weights for sub-index build priority. For example, a sub-index type corresponding to a physical hot data range within the NoSQL database can have an increased weight for sub-index build priority because the data in the physical hot data range has an increased frequency of use.

Figure 5:
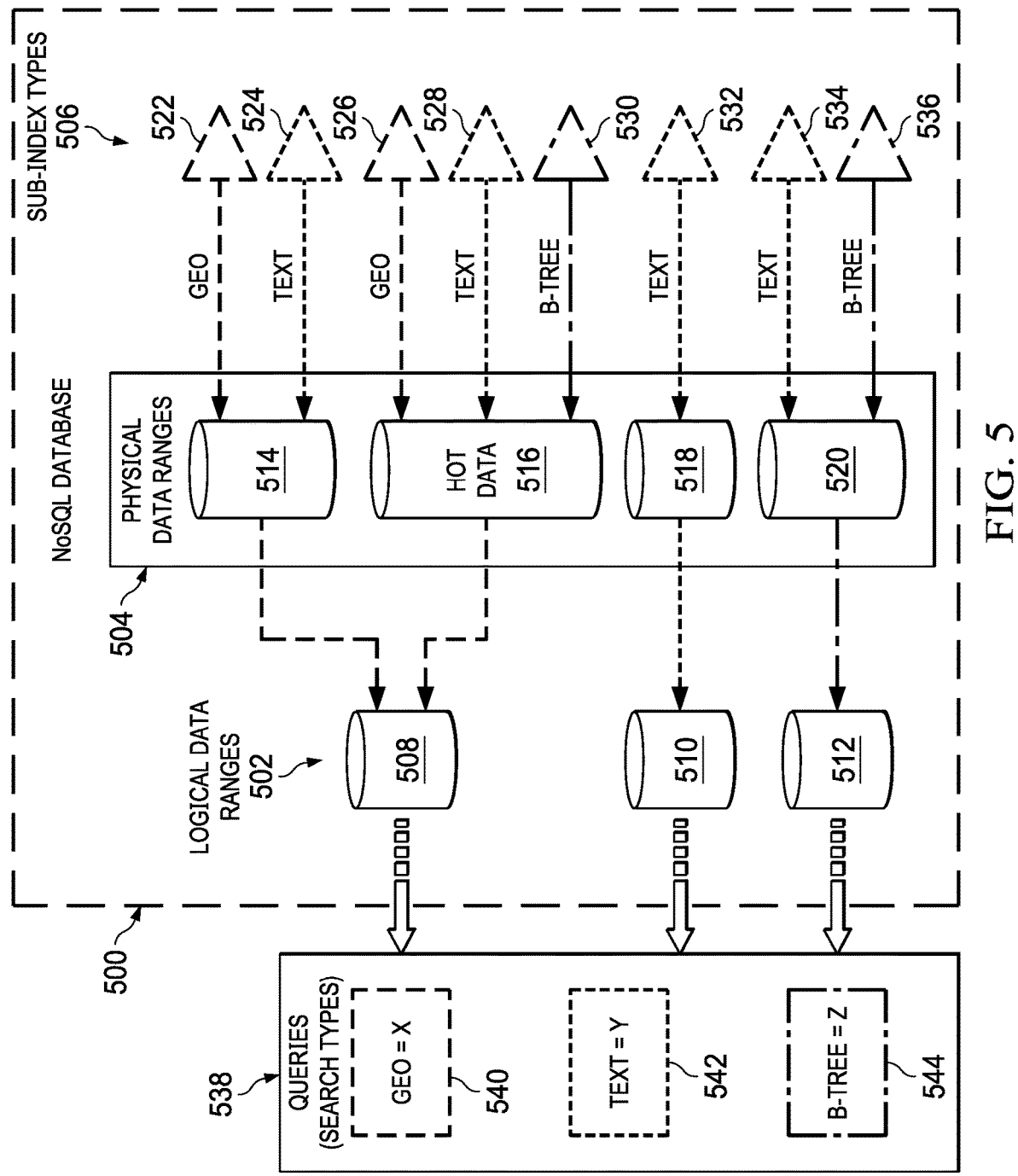
FIG. 5 is a diagram illustrating an example of a NoSQL database in accordance with an illustrative embodiment.

With reference now to FIG. 5, a diagram illustrating an example of a NoSQL database is depicted in accordance with an illustrative embodiment. NoSQL database 500 may be implemented in a NoSQL server, such as NoSQL database 302 implemented in NoSQL server 300 in FIG. 3.

NoSQL database 500 includes logical data ranges 502, physical data ranges 504, and sub-index types 506. Logical data ranges 502 may be, for example, logical data ranges 404 in FIG. 4. In this example, logical data ranges 502 include logical data range 508, logical data range 510, and logical data range 512, such as logical data range "A" 418, logical data range "B" 420, and logical data range "C" 422 in FIG. 4. Physical data ranges 504 include physical non-hot data range 514, physical hot data range 516, physical non-hot data range 518, and physical non-hot data range 520. A logical data range splitter, such as, for example, logical data range splitter 306 in FIG. 3, generates physical non-hot data range 514, physical hot data range 516, physical non-hot data range 518, and physical non-hot data range 520 based on logical data range 508, logical data range 510, and logical data range 512. However, it should be noted that logical data range 508 has a one-to-many relationship with physical non-hot data range 514 and physical hot data range 516, whereas logical data range 510 and logical data range 512 have a one-to-one relationship with physical non-hot data range 518 and physical non-hot data range 520, respectively.

Sub-index types 506 comprise an index for NoSQL database 500, such as, for example, sub-index types 328 comprising index 326 for NoSQL database 302 in FIG. 3. In addition, sub-index types 506 correspond to physical data ranges 504. For example, geospatial sub-index type 522 and full-text sub-index type 524 correspond to physical non-hot data range 514. It should be noted that geospatial sub-index type 522 and full-text sub-index type 524 comprise a set of sub-index types for physical non-hot data range 514. Similarly, geospatial sub-index type 526, full-text sub-index type 528, and B-tree sub-index type 530 comprise a set of sub-index types for physical hot data range 516. Full-text sub-index type 532 comprises a set of sub-index types for physical non-hot data range 518. Also, full-text sub-index type 534 and B-tree sub-index type 536 comprise a set of sub-index types for non-hot data range 520.

Each respective query in queries 538 has a particular search type, which corresponds to a particular sub-index type. For example, query 540 has a geospatial search type, which corresponds to geospatial sub-index type 522 for physical non-hot data range 514 and geospatial sub-index type 526 for physical hot data range 516. Similarly, query 542 has a full-text search type, which corresponds to full-text sub-index type 532 for physical non-hot data range 518 and query 544 has a B-tree search type, which corresponds to B-tree sub-index type 536 for physical non-hot data range 520.

Figure 6:
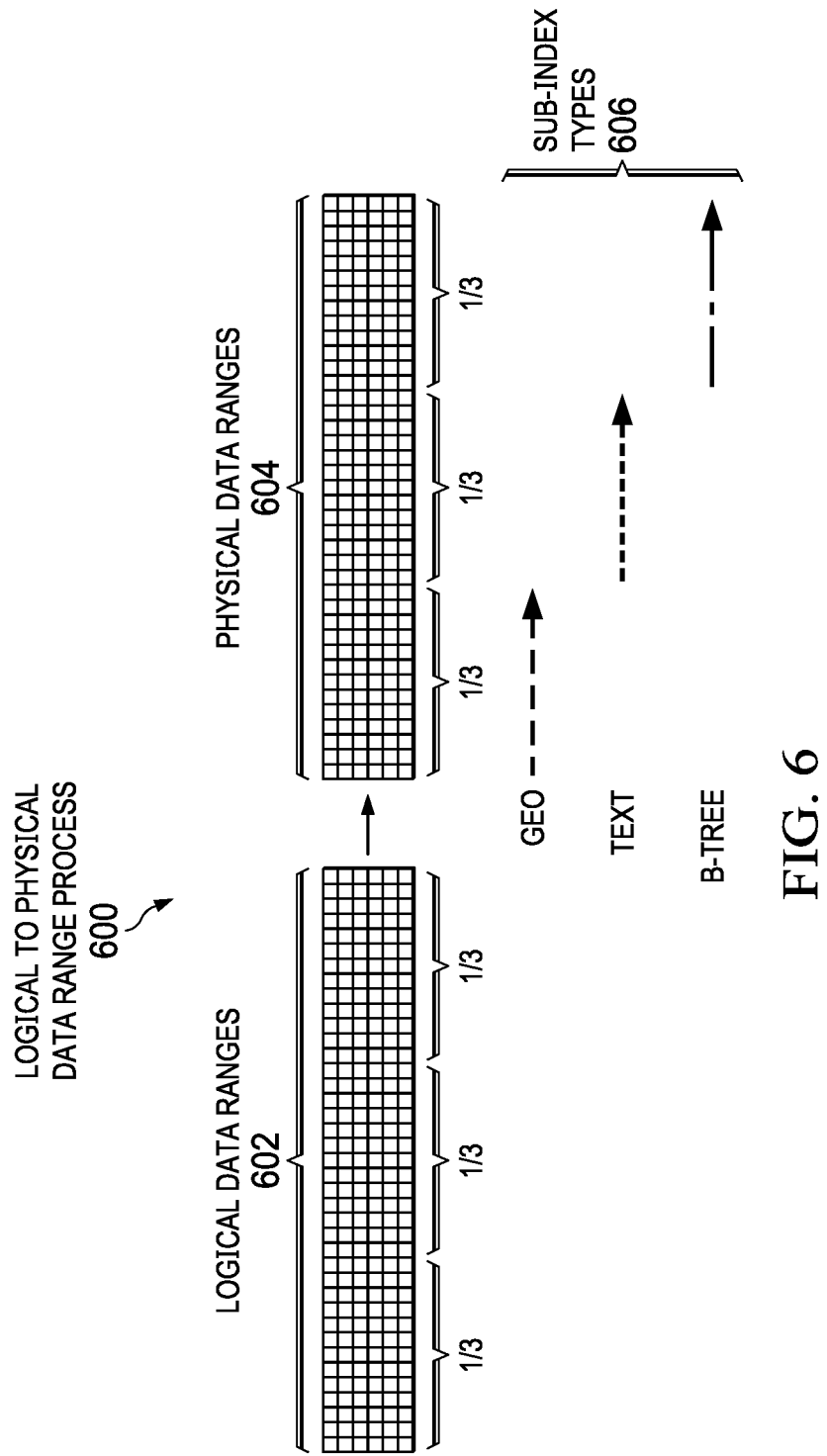
FIG. 6 is a diagram illustrating an example of a logical to physical data range process in accordance with an illustrative embodiment.

With reference now to FIG. 6, a diagram illustrating an example of a logical to physical data range process is depicted in accordance with an illustrative embodiment. Logical to physical data range process 600 may be implemented in a NoSQL server, such as, for example, NoSQL server 300 in FIG. 3.

In this example, logical to physical data range process 600 includes logical data ranges 602 and physical data ranges 604, such as, for example, logical data ranges 404 and physical data ranges 406 in FIG. 4. The NoSQL server utilizes a logical data range splitter, such as, for example, logical data range splitter 306 in FIG. 3, to divide data within a NoSQL database, such as, for example, NoSQL database 302 in FIG. 3, into logical data ranges 602. Further, the NoSQL server utilizes the logical data range splitter to convert logical data ranges 602 into physical data ranges 604 within the NoSQL database.

Furthermore, the NoSQL server utilizes a sub-index type builder, such as, for example, sub-index type builder 308 in FIG. 3, to build a different sub-index type of sub-index types 606 for each respective physical data range in physical data ranges 604. For example, the sub-index type builder builds a geospatial sub-index type for the first ⅓ physical data range, a full-text sub-index type for the second ⅓ physical data range, and a B-tree sub-index type for the last ⅓ physical data range. The NoSQL server then utilizes an index builder, such as, for example, index builder 310 in FIG. 3, to build an entire index for the NoSQL database using all of the different sub-index types in sub-index types 606 for the corresponding physical data ranges in physical data ranges 604.

Figure 7:
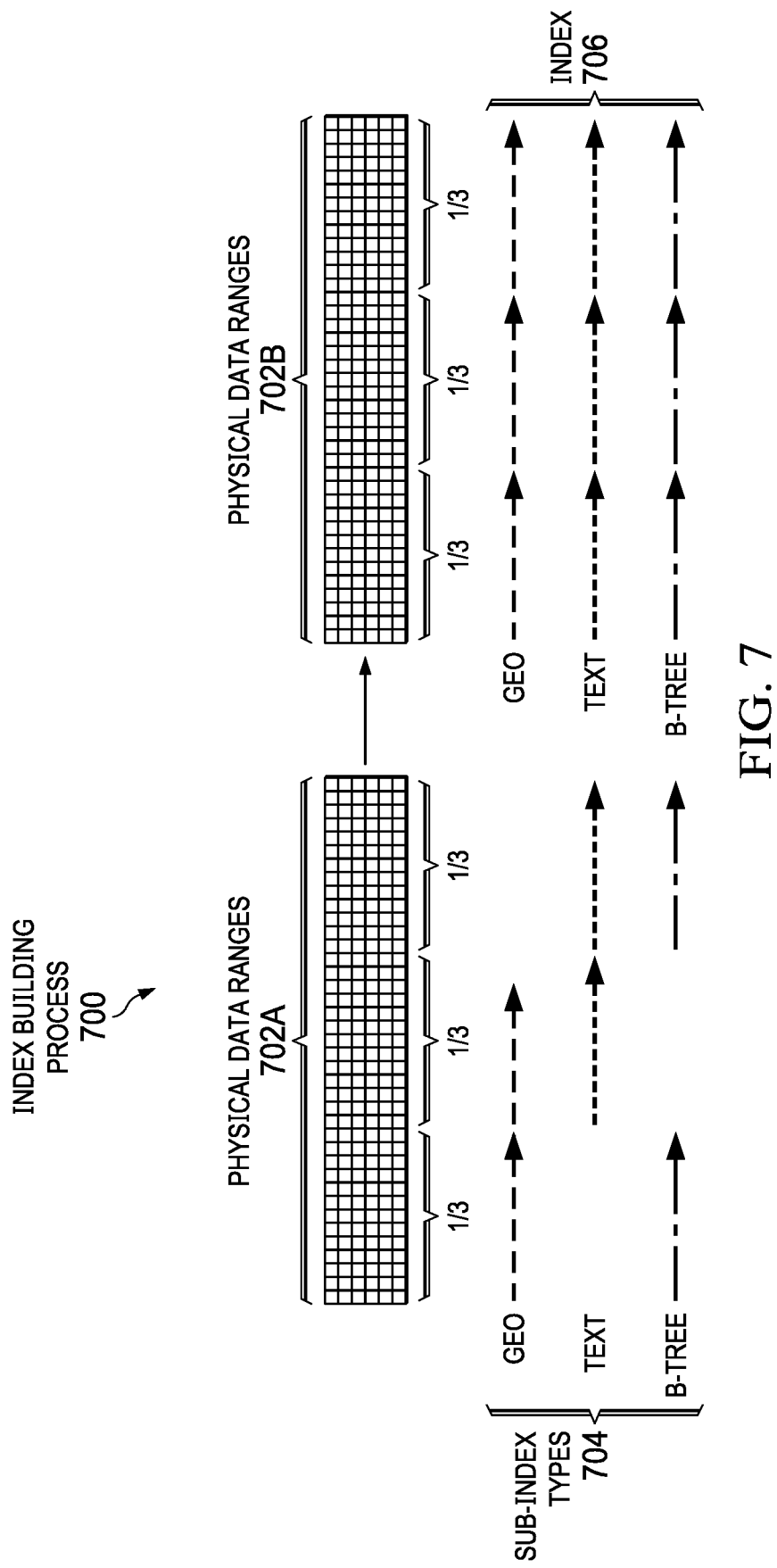
FIG. 7 is a diagram illustrating an example of an index building process in accordance with an illustrative embodiment.

With reference now to FIG. 7, a diagram illustrating an example of an index building process is depicted in accordance with an illustrative embodiment. Index building process 700 may be implemented in a NoSQL server, such as, for example, NoSQL server 300 in FIG. 3.

In this example, index building process 700 includes physical data ranges 702A and physical data ranges 702B. It should be noted that physical data ranges 702A and physical data ranges 702B represent the same physical data ranges in a NoSQL database, such as, for example, NoSQL database 500 in FIG. 5. Also, it should be noted that physical data ranges 702A and physical data ranges 702B are similar to physical data ranges 604 in FIG. 6.

Furthermore, the NoSQL server utilizes a sub-index type builder, such as, for example, sub-index type builder 308 in FIG. 3, to build sub-index types 704 for corresponding physical data ranges in physical data ranges 702A. For example, when a sub-index type for one physical data range is ready and available for use, the sub-index type builder builds a different sub-index type for another physical data range. Overtime, the entire index 706, which is comprised of a set of sub-index types for each respective physical data range in physical data ranges 702B, is ready and available for full use in the NoSQL database. As a result, the NoSQL server of illustrative embodiments increases index availability of the NoSQL database for different physical data ranges (e.g., hot data ranges) using different sub-index types and, therefore, increases data availability for query.

Figure 8:
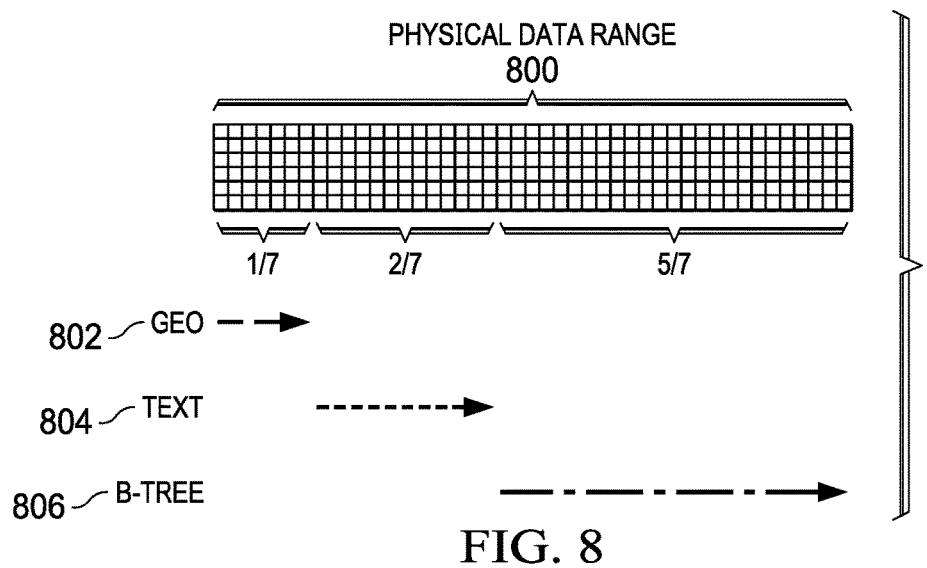
FIG. 8 is a diagram illustrating an example of a physical data range in accordance with an illustrative embodiment.

With reference now to FIG. 8, a diagram illustrating an example of a physical data range is depicted in accordance with an illustrative embodiment. Physical data range 800 may be implemented in a NoSQL database, such as, for example, NoSQL database 500 in FIG. 5. It should be noted that physical data range 800 represents a single physical data range. Further, physical data range 800 has a plurality of corresponding different sub-index types (i.e., geospatial sub-index type 802, full-text sub-index type 804, and B-tree sub-index type 806), which increases availability of physical data range 800 for query. A sub-index type builder, such as, for example, sub-index type builder 308 in FIG. 3, can build a specific sub-index type based on data usage (e.g., hot data) and cost of building that particular sub-index type. Further, the sub-index type builder can utilize different data ratios for the different sub-index types. In this example, the sub-index type builder allocates ⅐ of physical data range 800 to geospatial sub-index type 802, ²⁄₇ to full-text sub-index type 804, and ⁵⁄₇ to B-tree sub-index type 806. As a result, using more data of physical data range 800 to build B-tree sub-index type 806 increases availability of physical data range 800.

Figure 9:
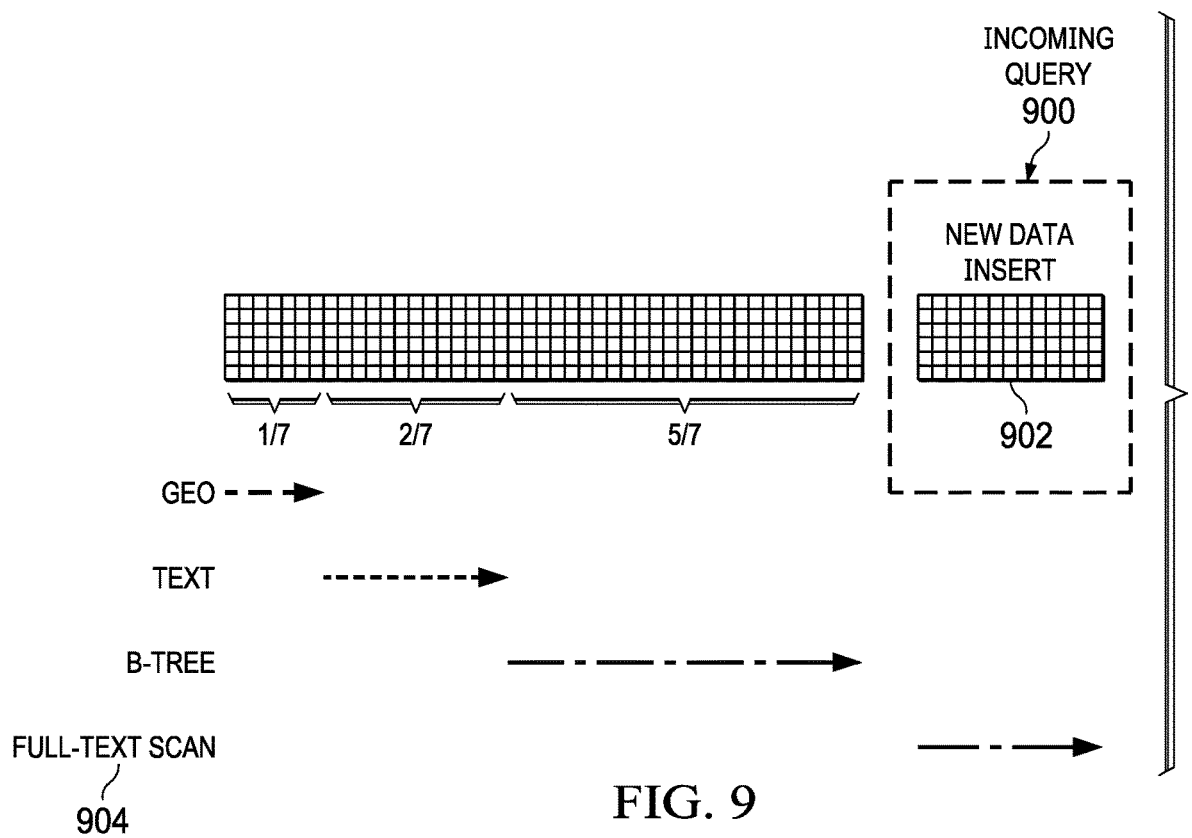
FIG. 9 is a diagram illustrating an example of an incoming query in accordance with an illustrative embodiment.

With reference now to FIG. 9, a diagram illustrating an example of an incoming query is depicted in accordance with an illustrative embodiment. Incoming query 900 may be, for example, query 336 in FIG. 3. In this example, incoming query 900 is new data insert 902. New data insert 902 is for inserting new data into a NoSQL database, such as, for example, NoSQL database 302 in FIG. 3.

When the NoSQL server rebuilds the index, such as, for example, index 326 in FIG. 3, for the NoSQL database, the NoSQL server starts to rebuild the index using the most-used sub-index type to include the change to the NoSQL database (i.e., the newly inserted data) and corresponding physical data range. However, the NoSQL server utilizes full-text scan 904 of the NoSQL database when the sub-index type for new data insert 902 is unavailable for query.

Figure 10:
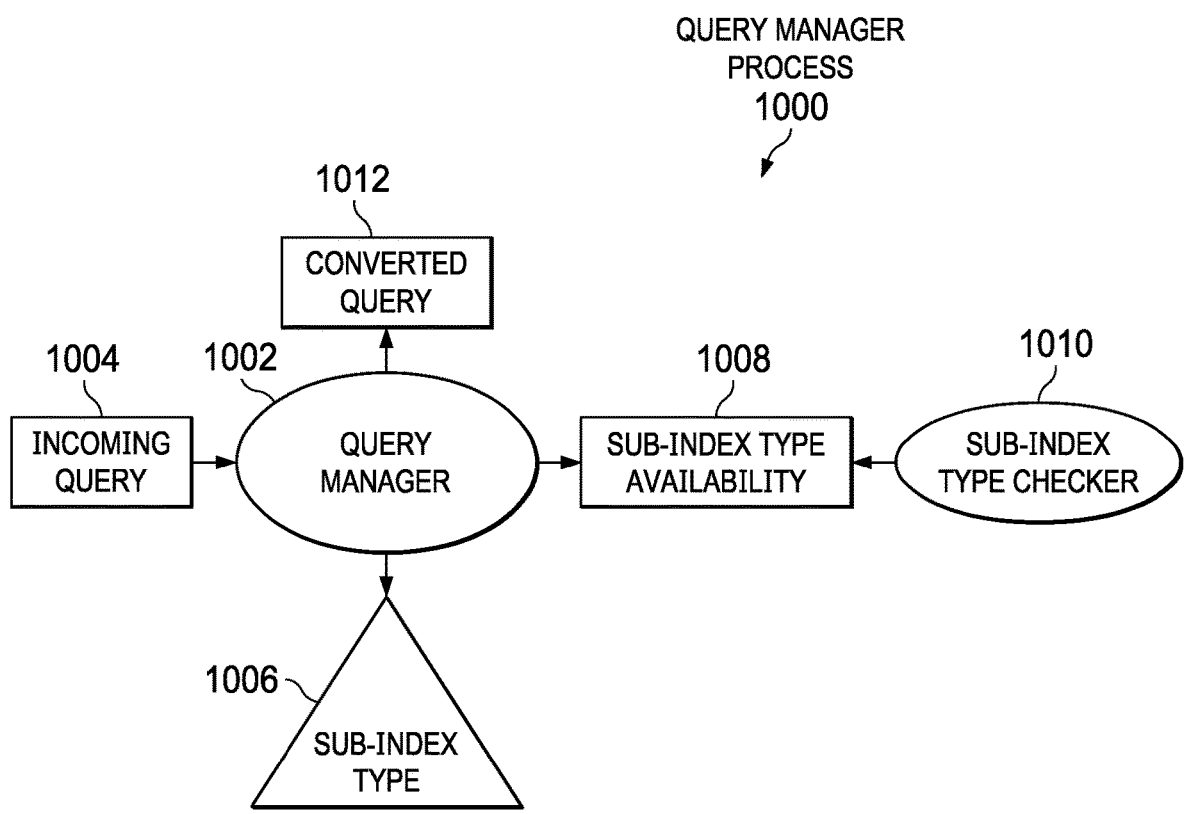
FIG. 10 is a diagram illustrating an example of a query manager process in accordance with an illustrative embodiment.

With reference now to FIG. 10, a diagram illustrating an example of a query manager process is depicted in accordance with an illustrative embodiment. Query manager process 1000 may be implemented in a NoSQL server, such as, for example, NoSQL server 300 in FIG. 3.

Query manager process 1000 includes query manager 1002, such as, for example, query manager 312 in FIG. 3. Query manager process 1000 starts when query manager 1002 receives incoming query 1004, such as, for example, incoming query 900 in FIG. 9. Incoming query 1004 is of a particular search type, which corresponds to particular sub-index type. At 1008, query manager 1002 checks sub-index type availability corresponding to the particular search type of incoming query 1004 using sub-index type checker 1010. Sub-index type checker 1010 may be, for example, sub-index type checker 314 in FIG. 3.

If the sub-index type checker determines that the particular sub-index type corresponding to the particular search type of incoming query 1004 is not available, then query manager 1002 converts incoming query to converted query 1012. Converted query 1012 is of a different or alternative search type, which corresponds to an available alternative sub-index type (i.e., sub-index type 1006) for the requested physical data range within the NoSQL database.

Figure 11:
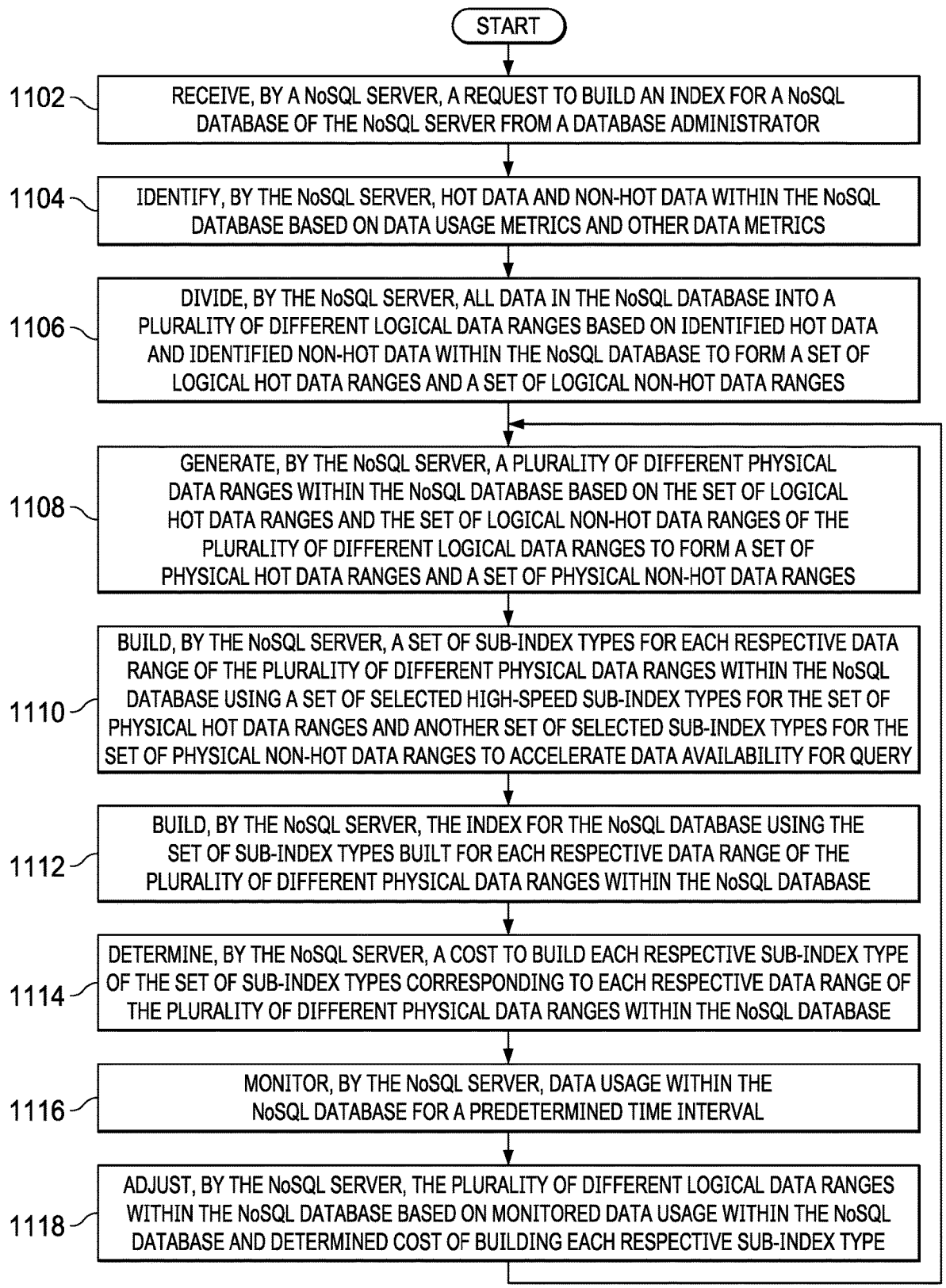
FIG. 11 is a flowchart illustrating a process for building an index for a NoSQL database in accordance with an illustrative embodiment.

With reference now to FIG. 11, a flowchart illustrating a process for building an index for a NoSQL database is shown in accordance with an illustrative embodiment. The process shown in FIG. 11 may be implemented in a computer, such as, for example, NoSQL server 104 in FIG. 1, data processing system 200 in FIG. 2, or NoSQL server 300 in FIG. 3.

The process begins when the NoSQL server receives a request to build the index for the NoSQL database of the NoSQL server from a database administrator (step 1102). In response to receiving the request to build the index, the NoSQL server identifies hot data and non-hot data within the NoSQL database based on data usage metrics and other data metrics (step 1104). In addition, the NoSQL server divides all data in the NoSQL database into a plurality of different logical data ranges based on identified hot data and identified non-hot data within the NoSQL database to form a set of logical hot data ranges and a set of logical non-hot data ranges (step 1106).

Afterward, the NoSQL server generates a plurality of different physical data ranges within the NoSQL database based on the set of logical hot data ranges and the set of logical non-hot data ranges of the plurality of different logical data ranges to form a set of physical hot data ranges and a set of physical non-hot data ranges (step 1108). Further, the NoSQL server builds a set of sub-index types for each respective data range of the plurality of different physical data ranges within the NoSQL database using a set of selected high-speed sub-index types for the set of physical hot data ranges and another set of selected sub-index types for the set of physical non-hot data ranges to accelerate data availability for query (step 1110). It should be noted that when the NoSQL server completes building a respective sub-index type for a particular data range within the NoSQL database, that respective sub-index type is ready and available to be used for query of that particular data range within the NoSQL database even though the entire index for the NoSQL database is not yet built.

Subsequently, the NoSQL server builds the index for the NoSQL database using the set of sub-index types built for each respective data range of the plurality of different physical data ranges within the NoSQL database (step 1112). The NoSQL server also determines a cost to build each respective sub-index type of the set of sub-index types corresponding to each respective data range of the plurality of different physical data ranges within the NoSQL database (step 1114). Furthermore, the NoSQL server monitors data usage within the NoSQL database for a predetermined time interval (step 1116). The predetermined time interval may be, for example, a predefined number of minutes, hours, days, or the like.

Moreover, the NoSQL server adjusts the plurality of different logical data ranges within the NoSQL database based on monitored data usage within the NoSQL database and determined cost of building each respective sub-index type (step 1118). Thereafter, the process returns to step 1108 where the NoSQL server generates different physical data ranges within the NoSQL database based on the adjusted logical data ranges to form adjusted physical hot data ranges and adjusted physical non-hot data ranges.

Figure 12:
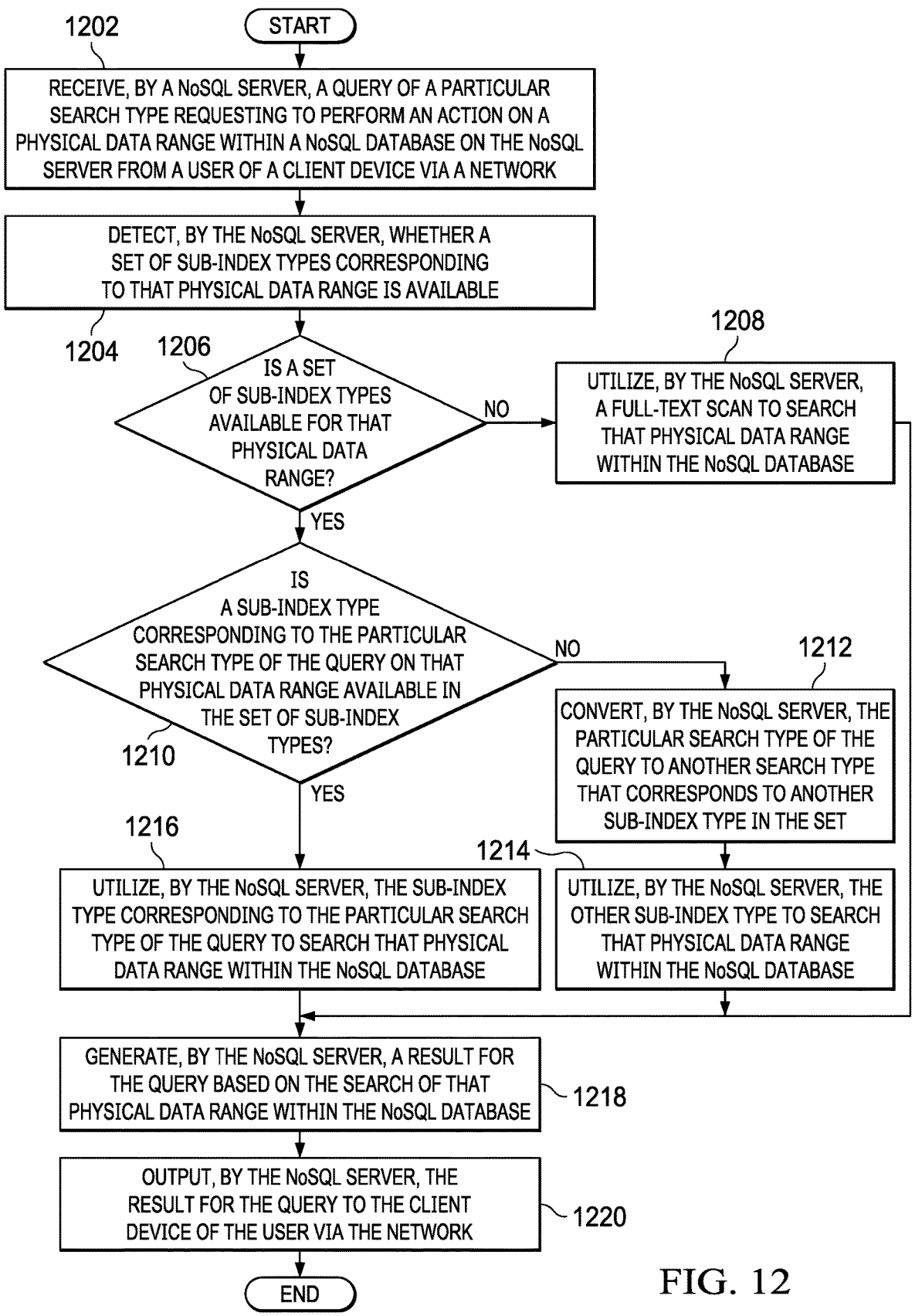
FIG. 12 is a flowchart illustrating a process for processing a NoSQL database query in accordance with an illustrative embodiment.

With reference now to FIG. 12, a flowchart illustrating a process for processing a NoSQL database query is shown in accordance with an illustrative embodiment. The process shown in FIG. 12 may be implemented in a computer, such as, for example, NoSQL server 104 in FIG. 1, data processing system 200 in FIG. 2, or NoSQL server 300 in FIG. 3.

The process begins when the NoSQL server receives a query of a particular search type requesting to perform an action on a physical data range within a NoSQL database on the NoSQL server from a user of a client device via a network (step 1202). In response to receiving the query, the NoSQL server detects whether a set of sub-index types corresponding to that physical data range is available (step 1204).

Afterward, the NoSQL server makes a determination as to whether a set of sub-index types is available for that physical data range based on the detection (step 1206). If the NoSQL server determines that a set of sub-index types is not available for that physical data range, no output of step 1206, then the NoSQL server utilizes a full-text scan to search that physical data range within the NoSQL database (step 1208). Thereafter, the process proceeds to step 1218. If the NoSQL server determines that a set of sub-index types is available for that physical data range, yes output of step 1206, then the NoSQL server makes a determination as to whether a sub-index type corresponding to the particular search type of the query on that physical data range is available in the set of sub-index types (step 1210).

If the NoSQL server determines that a sub-index type corresponding to the particular search type of the query on that physical data range is not available in the set of sub-index types for that physical data range, no output of step 1210, then the NoSQL server converts the particular search type of the query to another search type that corresponds to another sub-index type (i.e., an alternative sub-index type) in the set of sub-index types for that physical data range (step 1212). The NoSQL server utilizes the other sub-index type (i.e., the alternative sub-index type) in the set of sub-index types for that physical data range to search that physical data range within the NoSQL database to provide increased availability for the query (step 1214). Thereafter, the process proceeds to step 1218.

Returning again to step 1210, if the NoSQL server determines that a sub-index type corresponding to the particular search type of the query on that physical data range is available in the set of sub-index types, yes output of step 1210, then the NoSQL server utilizes the sub-index type corresponding to the particular search type of the query to search that physical data range within the NoSQL database (step 1216). Subsequently, the NoSQL server generates a result for the query based on the search of that physical data range within the NoSQL database (step 1218). Further, the NoSQL server outputs the result for the query to the client device of the user via the network (step 1220). Thereafter, the process terminates.

Thus, illustrative embodiments of the present invention provide a computer-implemented method, computer system, and computer program product for building and using multiple different types of sub-indices to search corresponding data ranges in a NoSQL database. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for building and using multiple different types of sub-indices to search a database, the computer-implemented method comprising:
generating, by a computer, a plurality of different physical data ranges within the database based on a set of logical hot data ranges and a set of logical non-hot data ranges of a plurality of different logical data ranges to form a set of physical hot data ranges and a set of physical non-hot data ranges;
building, by the computer, a set of sub-index types for each respective data range of the plurality of different physical data ranges within the database, wherein the set of sub-index types includes a set of selected high-speed sub-index types for the set of physical hot data ranges and includes a second set of selected sub-index types for the set of physical non-hot data ranges to accelerate data availability for query, wherein the set of selected high-speed sub-index types are different from the second set of selected sub-index types;

building, by the computer, an index for the database using the set of sub-index types built for each respective data range of the plurality of different physical data ranges within the database;

receiving, by the computer, a query of a particular search type requesting to perform an action on a physical data range within the database on the computer;

generating, by the computer, a result for the query based on a search of that physical data range within the database; and outputting, by the computer, the result for the query.

2. The computer-implemented method of claim 1 further comprising:

receiving, by the computer, a request to build the index for the database of the computer;

responsive to receiving the request to build the index, identifying, by the computer, hot data and non-hot data within the database based on data usage metrics; and dividing, by the computer, data in the database into the plurality of different logical data ranges based on identified hot data and identified non-hot data within the database to form the set of logical hot data ranges and the set of logical non-hot data ranges.

3. The computer-implemented method of claim 1 further comprising:

determining, by the computer, a cost to build each respective sub-index type of the set of sub-index types corresponding to each respective data range of the plurality of different physical data ranges within the database;

monitoring, by the computer, data usage within the database for a predetermined time interval; and adjusting, by the computer, the plurality of different logical data ranges within the database based on monitored data usage within the database and determined cost of building each respective sub-index type.

4. The computer-implemented method of claim 1 further comprising:

responsive to receiving the query, detecting, by the computer, whether a set of sub-index types corresponding to that physical data range is available; and determining, by the computer, whether a set of sub-index types is available for that physical data range based on the detecting.

5. The computer-implemented method of claim 4 further comprising:

responsive to the computer determining that a set of sub-index types is not available for that physical data range, utilizing, by the computer, a full-text scan to search that physical data range within the database.

6. The computer-implemented method of claim 4 further comprising:

responsive to the computer determining that a set of sub-index types is available for that physical data range, determining, by the computer, whether a sub-index type corresponding to the particular search type of the query on that physical data range is available in the set of sub-index types for that physical data range;

responsive to the computer determining that a sub-index type corresponding to the particular search type of the query on that physical data range is not available in the set of sub-index types for that physical data range, converting, by the computer, the particular search type of the query to another search type that corresponds to another sub-index type in the set of sub-index types for that physical data range; and utilizing, by the computer, said another sub-index type in the set of sub-index types for that physical data range to search that physical data range within the database to provide increased availability for the query.

7. The computer-implemented method of claim 6 further comprising:

responsive to the computer determining that a sub-index type corresponding to the particular search type of the query on that physical data range is available in the set of sub-index types for that physical data range, utilizing, by the computer, the sub-index type corresponding to the particular search type of the query to search that physical data range within the database.

8. The computer-implemented method of claim 1, wherein when the computer completes building a respective sub-index type for a particular data range, that respective sub-index type is ready and available to be used for query of that particular data range within the database even though the index for the database is not yet built.

9. The computer-implemented method of claim 8, wherein the respective sub-index type is selected from a group consisting of a geospatial sub-index type, a B-tree sub-index type, and a full-text sub-index type.

10. The computer-implemented method of claim 1, wherein different sub-index types corresponding to different physical data ranges have different weights for sub-index build priority.

11. The computer-implemented method of claim 1, wherein the computer is a NoSQL server and the database is a NoSQL database.

12. A computer system for building and using multiple different types of sub-indices to search a database, the computer system comprising:

a bus system;

a storage device connected to the bus system, wherein the storage device stores program instructions; and a processor connected to the bus system, wherein the processor executes the program instructions to:

generate a plurality of different physical data ranges within the database based on a set of logical hot data ranges and a set of logical non-hot data ranges of a plurality of different logical data ranges to form a set of physical hot data ranges and a set of physical non-hot data ranges;

build a set of sub-index types for each respective data range of the plurality of different physical data ranges within the database, wherein the set of sub-index types includes a set of selected high-speed sub-index types for the set of physical hot data ranges and includes a second set of selected sub-index types for the set of physical non-hot data ranges to accelerate data availability for query, wherein the set of selected high-speed sub-index types are different from the second set of selected sub-index types;

build an index for the database using the set of sub-index types built for each respective data range of the plurality of different physical data ranges within the database;

receive a query of a particular search type requesting to perform an action on a physical data range within the database;

generate a result for the query based on a search of that physical data range within the database; and output the result for the query.

13. The computer system of claim 12, wherein the processor further executes the program instructions to:
   receive a request to build the index for the database of the computer system; identify hot data and non-hot data within the database based on data usage metrics in response to receiving the request to build the index; and
   divide data in the database into the plurality of different logical data ranges based on identified hot data and identified non-hot data within the database to form the set of logical hot data ranges and the set of logical non-hot data ranges.

14. A computer program product for building and using multiple different types of sub-indices to search a database, the computer program product comprising a computer readable storage medium having program instructions embodied therewith, the program instructions executable by a computer to cause the computer to perform a method of:
   generating, by the computer, a plurality of different physical data ranges within the database based on a set of logical hot data ranges and a set of logical non-hot data ranges of a plurality of different logical data ranges to form a set of physical hot data ranges and a set of physical non-hot data ranges;
   building, by the computer, a set of sub-index types for each respective data range of the plurality of different physical data ranges within the database, wherein the set of sub-index types includes a set of selected high-speed sub-index types for the set of physical hot data ranges and includes a second set of selected sub-index types for the set of physical non-hot data ranges to accelerate data availability for query, wherein the set of selected high-speed sub-index types are different from the second set of selected sub-index types;
   building, by the computer, an index for the database using the set of sub-index types built for each respective data range of the plurality of different physical data ranges within the database;
   receiving, by the computer, a query of a particular search type requesting to perform an action on a physical data range within the database on the computer;
   generating, by the computer, a result for the query based on a search of that physical data range within the database; and
   outputting, by the computer, the result for the query.

15. The computer program product of claim 14 further comprising:
   receiving, by the computer, a request to build the index for the database of the computer; responsive to receiving the request to build the index, identifying, by the computer, hot data and non-hot data within the database based on data usage metrics; and
   dividing, by the computer, data in the database into the plurality of different logical data ranges based on identified hot data and identified non-hot data within the database to form the set of logical hot data ranges and the set of logical non-hot data ranges.

16. The computer program product of claim 14 further comprising:
   determining, by the computer, a cost to build each respective sub-index type of the set of sub-index types corresponding to each respective data range of the plurality of different physical data ranges within the database;
   monitoring, by the computer, data usage within the database for a predetermined time interval; and
   adjusting, by the computer, the plurality of different logical data ranges within the database based on monitored data usage within the database and determined cost of building each respective sub-index type.

17. The computer program product of claim 14 further comprising:
   responsive to receiving the query, detecting, by the computer, whether a set of sub-index types corresponding to that physical data range is available; and
   determining, by the computer, whether a set of sub-index types is available for that physical data range based on the detecting.

18. The computer program product of claim 17 further comprising:
   responsive to the computer determining that a set of sub-index types is not available for that physical data range, utilizing, by the computer, a full-text scan to search that physical data range within the database.

19. The computer program product of claim 17 further comprising:
   responsive to the computer determining that a set of sub-index types is available for that physical data range, determining, by the computer, whether a sub-index type corresponding to the particular search type of the query on that physical data range is available in the set of sub-index types for that physical data range;
   responsive to the computer determining that a sub-index type corresponding to the particular search type of the query on that physical data range is not available in the set of sub-index types for that physical data range, converting, by the computer, the particular search type of the query to another search type that corresponds to another sub-index type in the set of sub-index types for that physical data range; and
   utilizing, by the computer, said another sub-index type in the set of sub-index types for that physical data range to search that physical data range within the database to provide increased availability for the query.

20. The computer program product of claim 19 further comprising:
   responsive to the computer determining that a sub-index type corresponding to the particular search type of the query on that physical data range is available in the set of sub-index types for that physical data range, utilizing, by the computer, the sub-index type corresponding to the particular search type of the query to search that physical data range within the database.

* * * * *